(12) United States Patent
Sand et al.

(10) Patent No.: US 7,954,589 B2
(45) Date of Patent: Jun. 7, 2011

(54) SAFETY PEDAL SYSTEM

(75) Inventors: Stefan Sand, Hjärtum (SE); Mats Norrman, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 12/350,166

(22) Filed: Jan. 7, 2009

(65) Prior Publication Data
US 2009/0235777 A1    Sep. 24, 2009

(30) Foreign Application Priority Data

Jan. 8, 2008  (EP) .................................... 08000195

(51) Int. Cl.
*G05G 1/30* (2008.04)
(52) U.S. Cl. ............................ 180/274; 74/512; 74/560
(58) Field of Classification Search .............. 180/271, 180/274; 280/748; 74/512, 560
See application file for complete search history.

(56) References Cited

U.S. PATENT DOCUMENTS

| | | | |
|---|---|---|---|
| 6,571,659 B2 * | 6/2003 | Choi | 74/512 |
| 6,662,702 B1 * | 12/2003 | Vidot et al. | 89/1.14 |
| 6,679,135 B1 * | 1/2004 | Faigle et al. | 74/512 |
| 6,786,109 B2 * | 9/2004 | Mueller et al. | 74/512 |
| 2007/0235997 A1 * | 10/2007 | Canals Riba et al. | 280/748 |
| 2007/0266815 A1 * | 11/2007 | Johansson | 74/512 |

FOREIGN PATENT DOCUMENTS

| | | | |
|---|---|---|---|
| DE | 4340633 A1 | * | 6/1994 |
| DE | 19515852 A1 | * | 11/1995 |
| DE | 19617372 C1 | * | 1/1998 |
| DE | 10129661 A1 | | 1/2003 |
| DE | 102004001704 A1 | | 8/2005 |
| EP | 1488961 A1 | | 12/2004 |
| EP | 1488961 B1 | * | 8/2005 |
| FR | 2779112 A1 | | 12/1999 |
| WO | WO 9962748 A1 | * | 12/1999 |

OTHER PUBLICATIONS

European Patent Office, European Search Report for European Application No. 100157627, Feb. 10, 2011.

* cited by examiner

*Primary Examiner* — Paul N Dickson
*Assistant Examiner* — Joseph Rocca
(74) *Attorney, Agent, or Firm* — Ingrassia Fisher & Lorenz, P.C.

(57) ABSTRACT

A safety pedal system for an automotive vehicle is provided that includes, but is not limited to a pedal mounted in a pedal mounting arrangement arrangeable to at least partly release the pedal from the pedal mounting arrangement in event of a collision. The safety pedal system further includes, but is not limited to a triggering device arranged to receive a collision event signal and in response thereto trigger release of the pedal from the pedal mounting arrangement. The triggering device may also include, but is not necessarily limited to a pyrotechnical device arranged to exert a force on the pedal mounting arrangement thereby triggering release of the pedal from the pedal mounting arrangement.

9 Claims, 4 Drawing Sheets

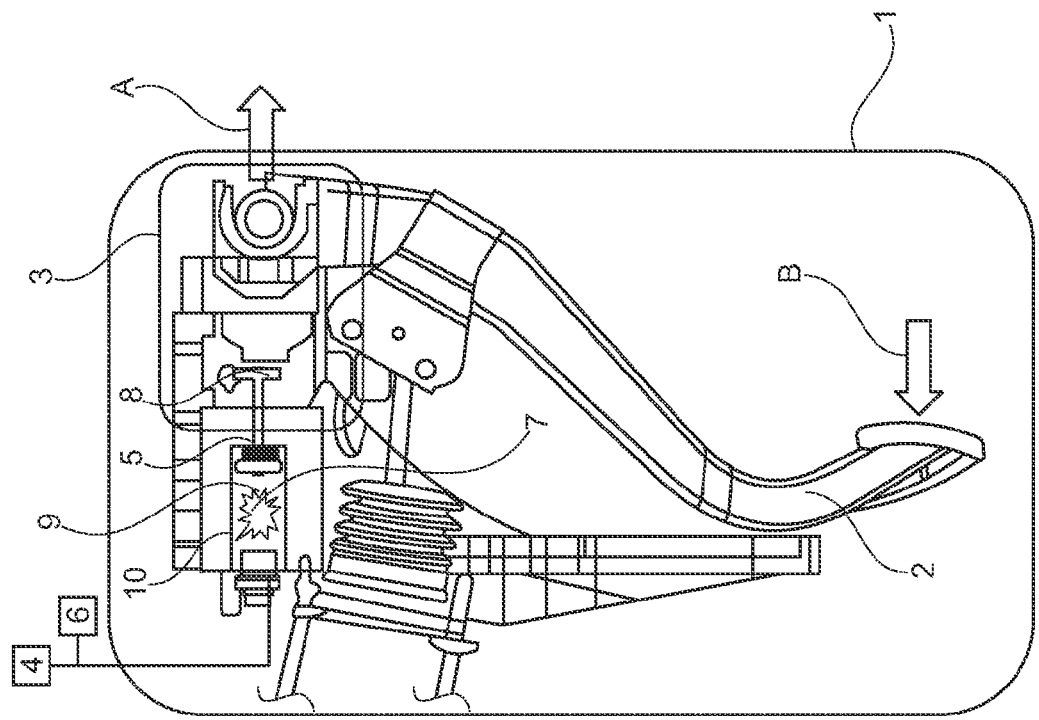
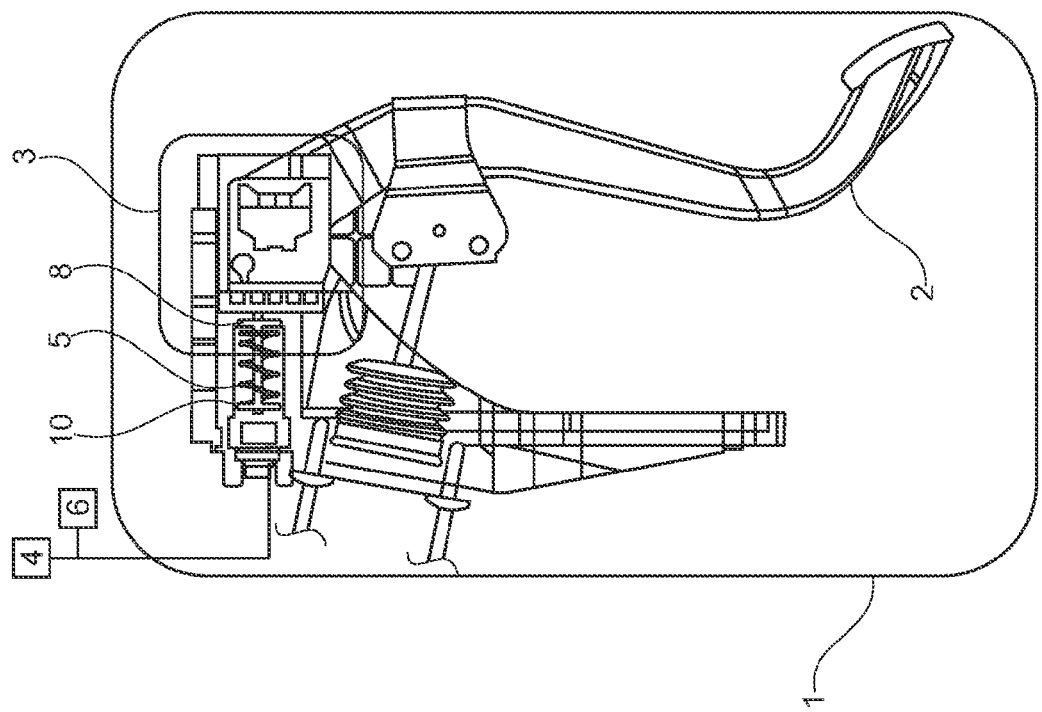

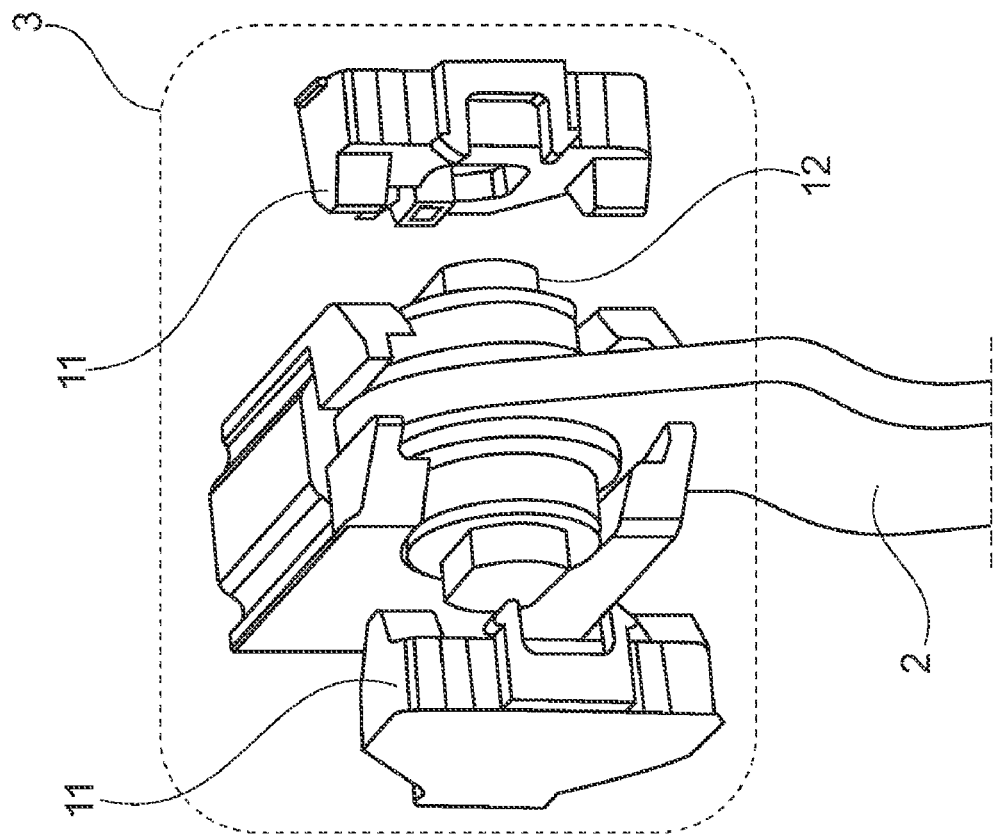
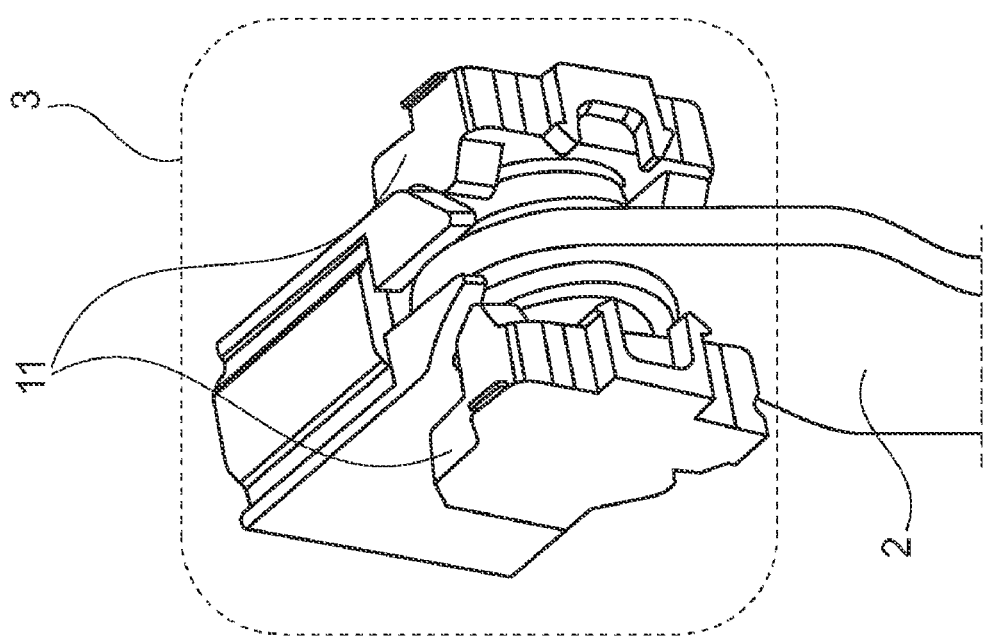

SAFETY PEDAL SYSTEM

CROSS-REFERENCE TO RELATED APPLICATION

This application claims priority to European Patent Application No. 08000195.1-1264, filed Jan. 8, 2008, which is incorporated herein by reference in its entirety.

TECHNICAL FIELD

The present invention relates to a safety pedal system for an automotive vehicle. In particular the present invention relates a safety pedal system for an automotive vehicle comprising a pedal mounted to a pedal mounting arrangement which is configured to release the pedal from its built-in position in event of a collision. The present invention also relates to a corresponding method.

BACKGROUND

It has for a long time been recognized that the driver of an automotive vehicle can be injured during a frontal crash by the collapse of the front end structure of the automotive vehicle. The pedals are mounted to this front end structure, which makes the pedals intrude back into the passenger compartment and towards the driver's feet. In the event of a crash, the driver has commonly forcibly depressed the brake pedal and/or the clutch pedal, in that the driver is holding his or her foot and leg down rigidly against the pedal. By this, large forces can be transmitted back through the driver's feet and legs, sufficient in some circumstances to cause severe injuries.

In efforts to avoid this, arrangements have been devised in the past to either cause the brake pedal mount to be shifted away during a crash by a deformation of a pivot mount support, or to completely release the pivot mount itself to allow the pedal to drop away in a crash, or by dividing the pedal arm in two by shifting to a lower pivot point to make the lower part of pedal arm forceless.

An example of a prior art arrangement is disclosed in DE 101 29 661. Here, the pedal axle is mounted between two pedal bars which, upon exceeding a force in the event of an accident, release the pedal axle which is then moved upwards by a stay which extends between an end wall and the component part above the axle and which is deflected upwards in a crash situation.

However, in the event of a collision it is important that the pedal is released quickly to avoid injuries to the driver. Thus, designs of pedal release systems which rely on deformation of the vehicle structure to move the pivot away may often act too slowly to avoid injuries.

Moreover, many systems rely on the mechanical interaction between some kind of release mechanism on the pedal system and a counterpart on a surrounding area attached to or belonging to the front end structure of the automotive vehicle (e.g., a cross-car-member or similar). However, in real life situations this kind of release mechanism often fails due to variations in collision impact angle or direction. Typical reasons for such a failure could be that only one side of the pedal system is released, that there is not enough space for the sides to deform due to surrounding components being in the way, or that the distance between the pivot and a cross beam, or similar, is to short so that the system "jams".

DE 10 2004 001 704 discloses a pedal release system for vehicles which has a release mechanism with a transmission part which engages at least one pedal and is led to an actuator via angled rollers. The transmission part is fastened to the back of the pedal and is led to the actuator situated above the rollers near the dash panel of the vehicle. The actuator is triggered by a sensor signal which simultaneously triggers the personal security systems such as the airbag.

In the arrangement disclosed in DE 10 2004 001 704, a pedal shaft is still attached. Thus, in the event of a collision in which the push rod, connecting the brake pedal and the brake cylinder, is pushed into the driver's compartment the push rod is a fully coupled system which pushes the pedal towards the driver. Thus, if the pedal pivot does not release, all the wire can is to try to pull back the pedal from the driver.

In view of the foregoing, there is still a need for an improved safety pedal system and a corresponding method.

In view of the above, at least one object is to solve or at least reduce the problems discussed above. In particular, an object is to enable the pedal to be quickly and reliably released from its built-in mounting position in the event of a collision in order to avoid that the pedal is forced back into the driver's foot or the lower part of the leg (e.g., the tibia) which could severely injure the driver. Hence, it is another object of the present to provide a safety pedal system for an automotive vehicle for releasing a pedal pivot mounting in an automotive vehicle when a frontal crash occurs, which system and method do not require a mechanical interaction between parts within and outside of the pedal system during a crash event to release the pedal, and which very quickly and reliably releases the pedal pivot mounting during a crash event which would otherwise force the pedal back into the driver's foot or leg. Moreover, other objects, needs, desirable features and characteristics will become apparent from the subsequent summary and detailed description, and the appended claims, taken in conjunction with the accompanying drawings and this background.

SUMMARY

According to one aspect of the invention, there is provided a safety pedal system for an automotive vehicle comprising a pedal mounted in a pedal mounting arrangement arrangeable or configured to at least partly release the pedal from the pedal mounting arrangement in event of a collision. The safety pedal system further comprises a triggering device arranged to receive a collision event signal and in response thereto trigger release of the pedal from the pedal mounting arrangement.

The safety pedal system enables early and quick activation. Whereas conventional pedal release systems typically require more or less a minimum deformation of the dash panel to ensure that the safety function is even started, the safety pedal system according to an embodiment of the present invention is not dependent on deformation of the vehicle structure to release the pedal The embodiments of present invention are based on the understanding that by detecting the event of a collision and triggering pedal release in response thereto, the pedal safety system can activate fully in the shortest possible time. Hence, injuries can be avoided as compared to conventional systems which may act too slowly. Furthermore, the system enables and secures pedal release to occur in all relevant situations regardless of impact direction of the collision. The release mechanism does not depend on the collision scenario per se (e.g., the impact direction, resulting in an enhanced reliability).

Another advantage of the embodiments of the present invention is that there is no risk of entrapment of the foot. Force of backward movement of the pedal pad towards the dash panel must be limited to prevent injury to the driver if the foot should be trapped under the pedal.

The safety pedal system also reduces restrictions on vehicle design, dimensioning and equipment, and enables implementation thereof on different vehicle platforms and variants within those platforms.

According to one embodiment of the inventive safety pedal system, the triggering device comprises a pyrotechnical device arranged to exert a force on the pedal mounting arrangement thereby triggering release of the pedal from the pedal mounting arrangement.

This arrangement enables enhanced reliability as the force exerted on the pedal mounting arrangement does not depend on the crash scenario, such as, for example, impact direction. As long as impact generated pulse is high enough the exerted force will trigger release of the pedal from its built-in position.

According to one embodiment of the inventive safety pedal system, the triggering device further comprises an actuator element. The pyrotechnical device is adapted to actuate the actuator element whereby a force is exerted on the pedal mounting arrangement. The actuator is mounted behind the pedal pivot. The actuator is arranged to communicate with a system control unit (e.g., a frontal airbag control unit). According to one embodiment of the inventive safety pedal system, the actuator element is a piston arranged in a sleeve. This arrangement is very suitable for actual production of a safety pedal system.

According to one embodiment, the inventive safety pedal system further comprises a sensor arranged to detect a collision event and in response thereto cause a collision event signal.

According to one embodiment, the inventive safety pedal system further comprises a control unit arranged in a signal path from the sensor to the triggering device, and the control unit is adapted for receiving the collision event signal caused by the sensor; calculating severity of the collision based on information contained therein; and, in the event of a severe collision, transmitting the collision event signal to the triggering device.

Hence, the system control unit is arranged to receive data indicative of a collision between the vehicle and a foreign object. The system control unit is further arranged to calculate the severity of the collision and, while communication with the triggering device, to determine whether to deploy the triggering device for releasing the pedal from its mount.

According to one embodiment, the inventive safety pedal system is in communication with an air bag control unit, whereby air bag deployment causes a collision event signal.

The deployment of the triggering device may be in sequence with the deployment of (e.g., the front driver air bag), by e.g., some ms.

According to another aspect of the invention, there is provided a method for at least partly releasing a pedal from a pedal mounting arrangement in event of a collision comprising the steps of receiving a collision event signal; and triggering release of the pedal from the pedal mounting arrangement in response thereto.

According to one embodiment, the method according to the invention further comprises the step of exerting a force on the pedal mounting arrangement in order to trigger release of the pedal from the pedal mounting arrangement.

According to one embodiment, the method according to the invention further comprises the step of transferring the force by means of an actuator element.

According to one embodiment, the method according to the invention further comprises the steps of detecting a collision event by means of a sensor; and cause a collision event signal in response thereto.

According to one embodiment, the method according to the invention further comprises the steps of receiving the collision event signal caused by the sensor; calculating severity of the collision based on information contained therein; determining whether to release the pedal from the pedal mounting arrangement based on a result thereof, and in the event of a severe collision, transmitting the collision event signal to the triggering device.

According to one embodiment, the method according to the invention further comprises the step of releasing the pedal from its pedal mounting arrangement as a consequence of air bag deployment.

According to one embodiment, the method according to the invention further comprises the step of detecting an imminent collision.

The advantages of the method according to the present invention correspond to the advantages obtained by the safety pedal system according to the present invention, as is depicted above.

Additional advantages of the safety pedal system according to the present invention include the following.

The pedal release function represents a maximum of 4 points out of total 37 for achieving the 5 star NCAP rating. Hence, pedal safety is a very important area for overall automotive vehicle safety. With the present invention, brake pedal contribution to fulfill the 5 star NCAP test can be secured. Due to increased crash safety requirements (such as, e.g., reflected in the NCAP test) one can expect high complexity and high risks in validating the functionality needs for fulfilling 5 star NCAP ratings with current mechanical pedal release system.

Time and cost of developing safety pedal systems will be reduced, due to a "pre-qualified" release function.

Today's various mechanical systems can be replaced by a new concept for which validation time and cost for a complex amount of vehicle variants and crash load cases will be reduced due to a more controlled and repeatable release function.

Real life safety will increase due to that there will be more accurate pedal releases in that the pedal release function is not dependent on vehicle architecture and surrounding sub-systems and in that it is sequenced to the airbag deployment. It can be the same cross platforms.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. References to "a/the [collision, crash, etc]" are to be interpreted interchangeably. Other objectives, features and advantages of the present invention will appear from the following detailed disclosure, from the attached dependent claims as well as from the drawings. The notion "release of the pedal", or similar expressions, is to be interpreted openly in that "release" not necessarily need to indicate that the pedal is fully released, or fully made "free" from the pedal mounting arrangement, just that the release is enough for the invention to function as intended. For example, the pedal may be "released" but still connected to the pedal mounting arrangement in some way.

BRIEF DESCRIPTION OF THE DRAWINGS

The present invention will hereinafter be described in conjunction with the following drawing figures, wherein like numerals denote like elements, and:

FIG. 1a is a side view disclosing the safety pedal system according to one embodiment of the present invention;

FIG. 1b is a side view disclosing the safety pedal system according to one embodiment of the present invention;

FIG. 2a is a close-up perspective view disclosing some of the internal parts of a pedal mounting arrangement in the safety pedal system according to one embodiment of the present invention, before release of a pedal from a pedal mounting arrangement;

FIG. 2b is a close-up perspective view disclosing some of the internal parts of a pedal mounting arrangement in the safety pedal system according to one embodiment of the present invention, after (or during) release of a pedal from a pedal mounting arrangement;

DETAILED DESCRIPTION

Figure 3A:
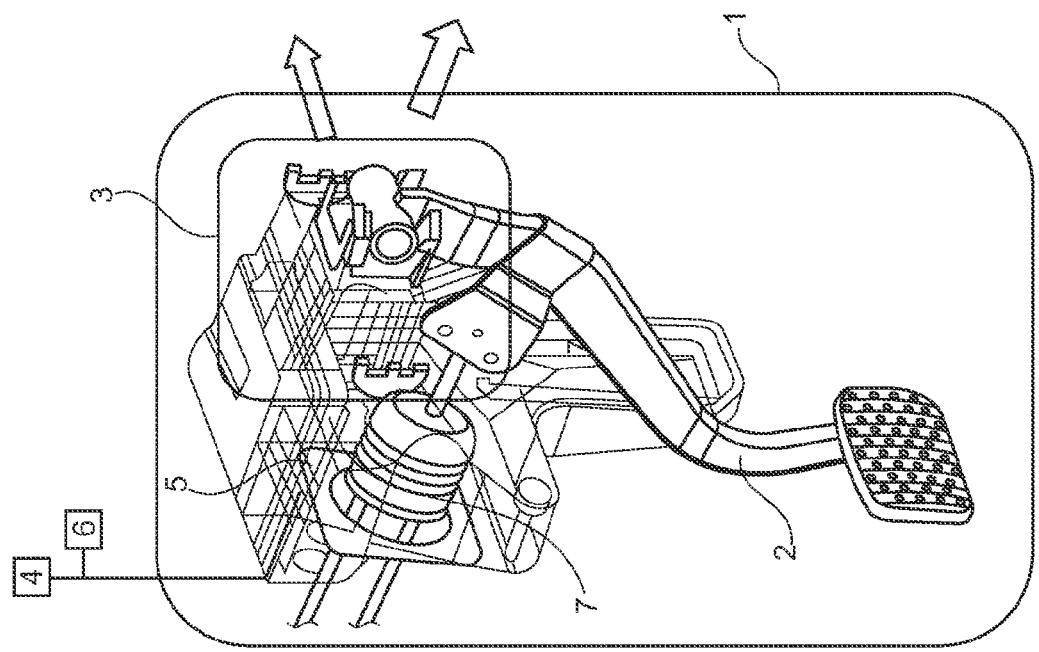
FIG. 3a is a perspective view of the safety pedal system according to one embodiment of the present invention, before release of a pedal from a pedal mounting arrangement.

The following detailed description is merely exemplary in nature and is not intended to limit application and uses. Furthermore, there is no intention to be bound by any theory presented in the preceding background and summary or the following detailed description.

FIG. 1a is a side view disclosing the safety pedal system according to one embodiment of the present invention. In particular it discloses a section of the triggering device in the safety pedal system before release of a pedal from a pedal mounting arrangement.

FIG. 1b is a side view disclosing the safety pedal system according to one embodiment of the present invention. In particular it discloses a section of the triggering device in the safety pedal system after (or during) release of a pedal from a pedal mounting arrangement.

In the event of a collision, the pedal 2 is at least partly released from the pedal mounting arrangement 3. In a presently preferred embodiment of the safety pedal system according to the present invention, this is accomplished as follows.

A sensor 4 detects a collision event and causes a collision event signal in response to the detection of the collision event. A control unit 6 is arranged in a signal path from the sensor 4 to a triggering device 5. The control unit 6 is adapted for receiving the collision event signal caused by the sensor 4, calculating the severity of the collision event based on information contained in the collision event signal. In the event of a severe collision, the control unit 6 transmits the collision event signal to the triggering device 5.

The triggering device 5 is adapted to receive the collision event signal and, in response to receiving the collision event signal, it is adapted to exert a force on the pedal mounting arrangement 3 in order to trigger release of the pedal 2 from the pedal mounting arrangement 3.

In a preferred embodiment, the triggering device 5 comprises a pyrotechnical device 7, which is adapted to actuate an actuator element 8 to exert the force on the pedal mounting arrangement 3 thereby triggering release of the pedal 2 from the pedal mounting arrangement 3. In this case the actuator element comprises a piston 9 arranged in a sleeve 10.

In a preferred embodiment, the safety pedal system 1 is in communication with an air bag control unit (not shown), whereby air bag deployment causes a collision event signal and the pedal 2 is released from its pedal mounting arrangement 3 as a consequence of air bag deployment. In other words, sensor 4 and control unit 6 may be part of or coupled to an air bag system (e.g. the driver's front air bag).

As is seen in FIG. 1a and FIG. 1b, the pedal mounting arrangement 3 of the safety pedal system 1 is intended to be built-in to a pedal hub area, such as pivot axel or similar. FIG. 1a and FIG. 1b shows one example of such a concept, wherein, at deployment of the triggering device 5, side brackets 11 (shown in FIG. 2a and FIG. 2b) goes outward and the pedal 2 come loose from the side brackets 11 (as indicated by arrow A in FIG. 1b) so that the pedal 2 or pedal pad goes away from driver (as indicated by arrow B in FIG. 1b).

Now referring to FIG. 2a and FIG. 2b, FIG. 2a is a close-up perspective view disclosing some of the internal parts of a pedal mounting arrangement 3 in the safety pedal system 1 according to one embodiment of the present invention, before release of a pedal 2 from a pedal mounting arrangement 3, and FIG. 2b is a close-up perspective view disclosing some of the internal parts of a pedal mounting arrangement 3 in the safety pedal system 1 according to one embodiment of the present invention, after (or during) release of a pedal 2 from a pedal mounting arrangement 3.

In FIG. 2a, the pivot axle 12 mounting the pedal 2 is locked in position between side brackets 11. In FIG. 2b, the side brackets have been forced apart so that the pivot axle 12 is disengaged from the side brackets 11, thereby releasing the pedal 2 from the pedal mounting arrangement 3. As was described in relation to FIG. 1a and FIG. 1b, the side brackets 11 can be forced apart by means of a triggering device 5 comprising a pyrotechnical device 7 which is adapted to actuate an actuator element 8 to exert the force needed to force the side brackets 11 apart.

The embodiment shown in FIG. 1a, FIG. 1b, FIG. 2a, and FIG. 2b is focused on lateral release of the locking of the pivot axle 12. However, it can just as well be released vertically (e.g., if needed for package reasons (not shown)).

Figure 3B:
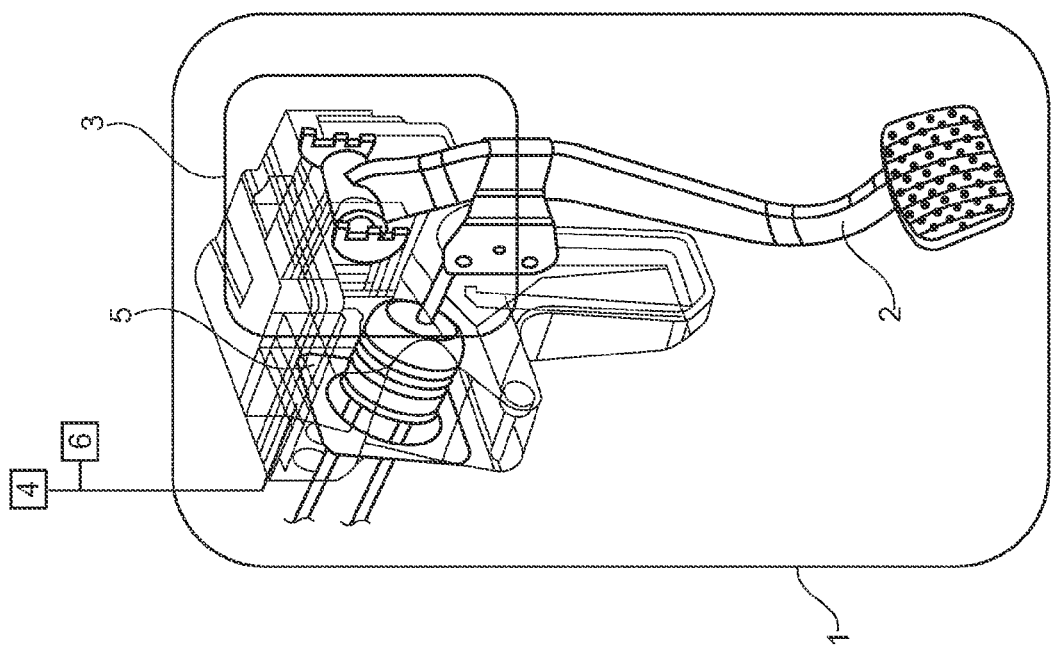
FIG. 3b is a perspective view of the safety pedal system according to one embodiment of the present invention, after (or during) release of a pedal from a pedal mounting arrangement.

FIG. 3a is a perspective view of the safety pedal system according to one embodiment of the present invention, before release of a pedal from a pedal mounting arrangement, and FIG. 3b is a perspective view of the safety pedal system according to one embodiment of the present invention, after (or during) release of a pedal from a pedal mounting arrangement. FIG. 3a and FIG. 3b provides a picture of the concepts shown in FIG. 1a, FIG. 1b, FIG. 2a and FIG. 2b taken together, in order to further enhance the understanding of the present invention.

Figure 4:
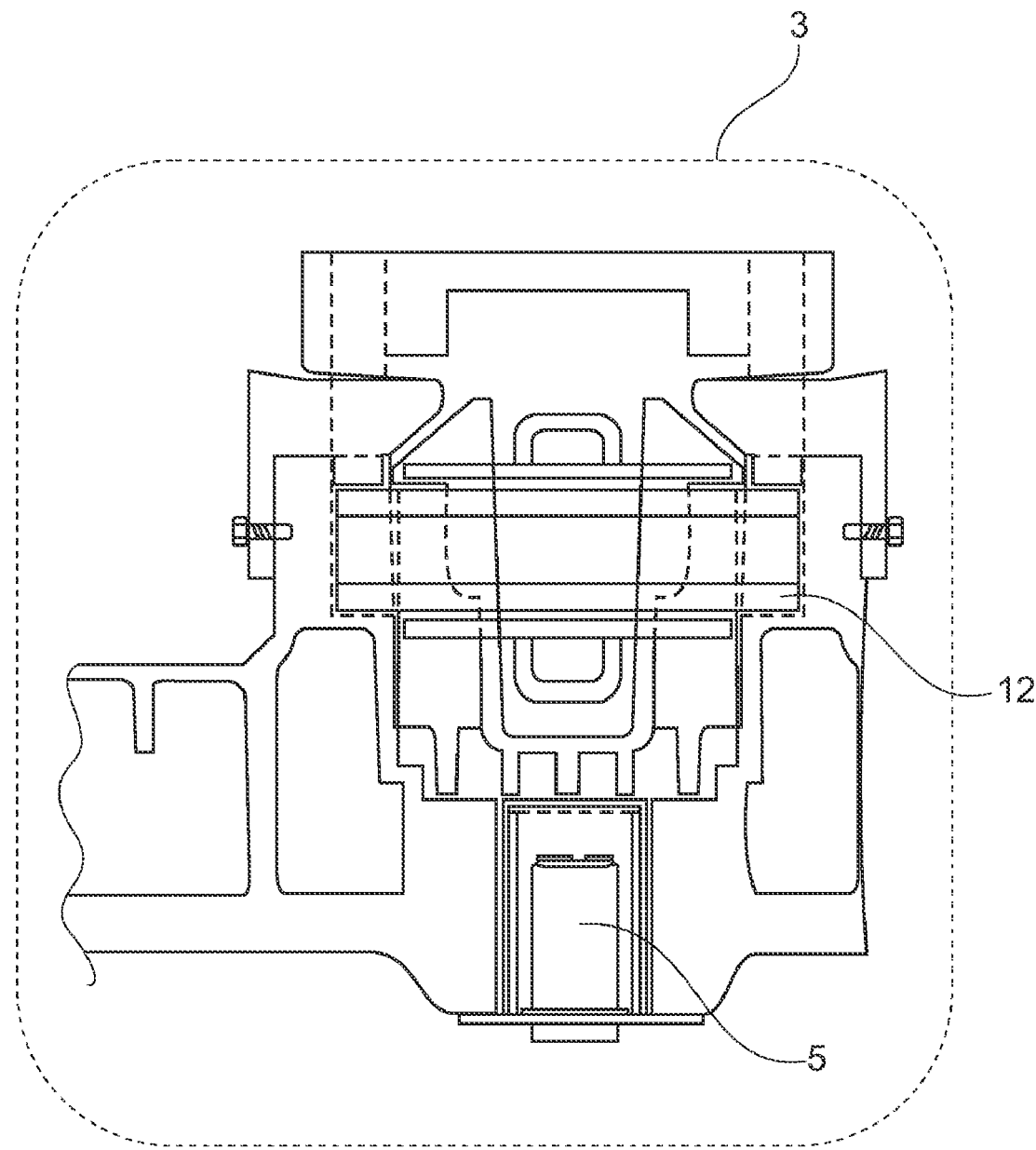
FIG. 4 discloses a top-view section of the triggering device and some other internal parts in the pedal mounting arrangement according to one embodiment of the present invention.

FIG. 4 discloses a top-view section of the triggering device 5 and some other internal parts (e.g., the pivot axle 12), in the pedal mounting arrangement 3 according to one embodiment of the present invention.

The invention has mainly been described above with reference to a few embodiments. However, as is readily appreciated by a person skilled in the art, other embodiments than the ones disclosed above are equally possible within the scope of the invention, as defined by the appended patent claims.

For example, the triggering device may comprise, instead of a pyrotechnical device, a gas generator or other similar device arranged to exert a force on the pedal mounting arrangement thereby triggering release of the pedal from the pedal mounting arrangement.

The sensor which is arranged to detect a collision event and in response thereto arranged to cause a collision event signal, may in addition be arranged to detect a potential crash before it occurs. Hence, the collision event signal may also be used as a preventive signal.

The description has been focused on pedal axel separation from brackets or carrier. However, the release of the pedal could be realized in many different ways, like pushrod disengagement, pedal axle separating from bracket or pedal arm internal separation.

Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A safety pedal system for a vehicle, comprising:
   a pedal mounting arrangement;
   a pedal mounted in the pedal mounting arrangement; the safety pedal system configured to allow for the at least partial release of the pedal from the pedal mounting arrangement in event of a collision; and
   a triggering device arranged to receive a collision event signal and in response to the collision event signal triggers the at least partly release of the pedal from the pedal mounting arrangement, the triggering device comprising:
   a pyrotechnical device arranged to exert a force on the pedal mounting arrangement; and
   an actuator element responsive to the pyrotechnical device for exerting the force on the pedal mounting arrangement, the actuator element comprising a piston arranged in a sleeve.

2. The safety pedal system according to claim 1, further comprising a sensor arranged to detect a collision event resulting in a generation of the collision event signal.

3. The safety pedal system according to claim 2, further comprising a control unit arranged in a signal path from the sensor to the triggering device, wherein the control unit is adapted to receive the collision event signal; calculate a severity of the collision based on information contained in the collision event signal; and, in the event of a severe collision, transmitting the collision event signal to the triggering device.

4. The safety pedal system according to claim 1, further comprising an air bag control unit that generates the collision event signal.

5. A method for at least partly releasing a pedal from a pedal mounting arrangement in event of a collision, comprising the steps of:
   receiving a collision event signal; and
   triggering release of the pedal from the pedal mounting arrangement in response the collision event signal, the triggering comprising:
   pyrotechnically exerting a force on the pedal mounting arrangement with a piston arranged in a sleeve to release the pedal from the pedal mounting arrangement.

6. The method according to claim 5, further comprising the steps of:
   detecting a collision event with a sensor; and
   generating the collision event signal in response to the detecting of the collision event with the sensor.

7. The method according to claim 6, further comprising the steps of:
   receiving the collision event signal caused by the sensor;
   calculating a severity of the collision based on information contained in the collision event signal;
   determining whether to release the pedal from the pedal mounting arrangement based on a result of the severity; and
   transmitting the collision event signal if a severe collision exists.

8. The method according to claim 5, further comprising the step of releasing the pedal from the pedal mounting arrangement as a consequence of air bag deployment.

9. The method according to claim 5, further comprising the step of detecting an imminent collision.

* * * * *